(12) United States Patent
Budd et al.

(10) Patent No.: US 6,557,686 B1
(45) Date of Patent: May 6, 2003

(54) ELECTRO-MAGNETIC ACTUATOR HAVING A SHORTENED MAGNETIC FLUX FLOW LOOP

(75) Inventors: Walter J. Budd, Rochester, MI (US); Steve R. Hojnacki, Jupiter, FL (US); Thomas J. Dolinshek, Baltimore, MI (US)

(73) Assignee: Pontiac Coil, Clarkston, MI (US)

( * ) Notice: Subject to any disclaimer, the term of this patent is extended or adjusted under 35 U.S.C. 154(b) by 0 days.

(21) Appl. No.: 09/548,757

(22) Filed: Apr. 13, 2000

Related U.S. Application Data
(60) Provisional application No. 60/129,161, filed on Apr. 14, 1999.

(51) Int. Cl.[7] .............................. F16D 19/00
(52) U.S. Cl. .................... 192/84.1; 335/220
(58) Field of Search .............. 192/58.1, 58.2, 192/58.4, 84.1, 56.61, 56.6; 335/220, 278

(56) References Cited

U.S. PATENT DOCUMENTS

| | | | | |
|---|---|---|---|---|
| 4,119,184 A | * | 10/1978 | Mower et al. ............ 192/82 T |
| 4,846,325 A | * | 7/1989 | Mohan ..................... 192/58 B |
| 4,893,703 A | * | 1/1990 | Kennedy et al. .......... 192/58 B |
| 5,025,906 A | * | 6/1991 | O'Neil et al. ............. 192/58 B |
| 5,511,643 A | * | 4/1996 | Brown .................... 192/58.61 |

* cited by examiner

*Primary Examiner*—Saúl Rodríguez
(74) *Attorney, Agent, or Firm*—Young & Basile

(57) ABSTRACT

An electro-magnetic actuator includes a shaft having a first end portion and a second end portion and a nut having an inner peripheral surface and an outer peripheral surface. The inner peripheral surface of the nut is coupled with the first end portion of the shaft. A bearing is disposed around the second end portion of the shaft for rotatably supporting the shaft. An electrical coil is disposed around the shaft between the nut and the bearing for receiving electrical current and producing magnetic flux. A ferromagnetic can is disposed around the shaft having a peripheral surface extending between the shaft and the outer peripheral surface of the nut for establishing a path for magnetic flux flow there between. The peripheral surface of the can is interposed between the electrical coil and the bearing partitioning the electrical oil inside the can and the bearing outside the can.

16 Claims, 4 Drawing Sheets

ELECTRO-MAGNETIC ACTUATOR HAVING A SHORTENED MAGNETIC FLUX FLOW LOOP

RELATED APPLICATIONS

This application claims the benefit of U.S. provisional Application No. 60/129,161, filed Apr. 14, 1999.

FIELD OF THE INVENTION

The subject invention relates to an electro-magnetic actuator having a shortened magnetic flux flow loop.

BACKGROUND OF THE INVENTION

Many modern vehicles include an engine and an electro-magnetic actuator for controlling a viscous fluid clutch associated with an engine cooling fan. In general operation, the clutch is designed to couple and decouple the fan and the engine. When the clutch is actuated, a rotary force is transmitted from the engine through the clutch to the fan. In this manner, the cooling fan is mechanically driven by the engine. Typically, the rotary force is produced by a water pump pulley within the engine. When the clutch is deactuated, the fan is decoupled from the engine. As such, no rotary force is transmitted from the engine to the fan. The electro-magnetic actuator is used to actuate and deactuate the clutch.

FIG. 1 is a cross-sectional side view of a prior art electro-magnetic actuator 10 attached to a known type of viscous fluid clutch 12. The prior art actuator 10 includes a housing 14, a rotary shaft or core 16, a nut 18, a non-magnetic stainless steel bushing 20, a bearing 22, an electrical coil 24, and a ferromagnetic can 26. The rotary shaft 16, includes a first end portion 28 disposed outside the housing 14 and a second end portion 30 disposed inside the housing 14. The entire shaft 16 is adapted to rotate or spin in relation to the housing 14.

The nut 18 includes an inner peripheral surface 32, an outer peripheral surface 34, and a fastening means 36, such as a thread. The fastening means 36 is adapted to attach the actuator 10 to the clutch 12. When attached, the nut 18 spins with the clutch 12. The stainless steel bushing 20 is adapted to couple the first end portion 28 of the shaft 16 and the inner peripheral surface 32 of the nut 18. When coupled, the shaft 16, the bushing 20, and the nut 18 form a interface surface 38 which spins with the clutch 12.

Conventionally, the actuator 10 is threaded into a mounting and interface port 40 in the clutch 12. In this arrangement, the interface surface 38 is disposed adjacent to a spring-loaded armature plate 42 located inside the clutch 12. The interface surface 38 is spaced from the armature plate 42 to form an air gap 44.

The bearing 22 is disposed around the second end portion 30 of the shaft 16. The bearing 22 is adapted to rotatably support the shaft 16. The electrical coil 24 is disposed around the shaft 16 between the nut 18 and the bearing 22. The electrical coil 24 is adapted to receive electrical current and produce magnetic flux.

The ferromagnetic can 26 is disposed around the shaft 16. The can 26 has a peripheral surface 46 extending between the shaft 16 and the outer peripheral surface 34 of the nut 18. The peripheral surface 46 of the can 26 establishes a path for magnetic flux flow between the shaft 16 and the outer peripheral surface 34 of the nut 18. The peripheral surface 46 of the can 26 is shaped to encase both the electrical coil 24 and the bearing 22 inside the can 26.

The electrical coil 24 forms a ring around the entire shaft 16 inside the can 26. When power is applied to the actuator 10, electrical current flows through the coil 24 producing magnetic flux. The magnetic flux flows in a loop 48, hereinafter referred to as a magnetic flux flow loop, which circles radially about the cross-sectional center point of the coil 24. The magnetic flux consists of magnetic lines of force which collectively constitute a magnetic field. The magnetic field is formed in a toroidal or doughnut like shape around the axis of the shaft 16.

The magnetic flux flow loop 48 is illustrated in FIG. 1. The magnetic flux flow loop 48 extends from the first end portion 28 of the shaft 16 through the length of the shaft 16 to the second end portion 30 of the shaft 16, from the second end portion 30 of the shaft 16 along the peripheral surface 46 of the can 26 around or outside both the bearing 22 and the electrical coil 24 to the outer peripheral surface 34 of the nut 18, from the outer peripheral surface 34 of the nut 18 through the nut 18 to the inner peripheral surface 32 of the nut 18, and between the inner peripheral surface 32 of the nut 18 and the first end portion 28 of the shaft 16 along an arch-shaped airborne path portion 50. The airborne path portion 50 of the magnetic flux flow loop 48 arches outwardly from the actuator 10 around the non-magnetic bushing 20.

When power is applied to the actuator 10, the airborne path portion 50 of the magnetic flux flow loop 48 applies a magnetic force across the air gap 44 onto the armature plate 42 located inside the clutch 12. The magnetic force pulls the armature plate 42 inward, from a spring-loaded closed position to an open position, reducing the air gap 44 between the armature plate 42 and the interface surface 38. In the open position, the armature plate 42 permits fluid flow and coupling within the clutch 12. In this manner, the actuator 10 actuates the clutch 12.

When power is not applied to the actuator 10, the armature plate 42 returns to the spring-loaded off position. In the spring-loaded off position, the armature plate 42 restricts fluid flow and coupling within the clutch 12. In this manner, the clutch 12 is deactuated.

Although the prior art actuator 10 effectively actuates and deactuates the clutch 12, it has several shortcomings. For one, the magnetic flux flow loop 48 about the electrical coil 24 is relatively long, thereby reducing the strength of the clutch actuation force and overall electrical efficiency of the actuator 10. For another, the bearing is a separate component disposed inside the can thus requiring associated labor and assembly time. Accordingly, it would be desirable to provide an electro-magnetic actuator which overcomes the shortcomings of the prior art.

SUMMARY OF INVENTION

The present invention is an electro-magnetic actuator having a shortened magnetic flux flow loop. The actuator includes a shaft having a first end portion and a second end portion and a nut having an inner peripheral surface and an outer peripheral surface. The inner peripheral surface of the nut is coupled with the first end portion of the shaft. A bearing is disposed around the second end portion of the shaft for rotatably supporting the shaft. An electrical coil is disposed around the shaft between the nut and the bearing for receiving electrical current and producing magnetic flux. A ferromagnetic can is disposed around the shaft having a peripheral surface extending between the shaft and the outer peripheral surface of the nut for establishing a path for magnetic flux flow there between. The peripheral surface of the can is interposed between the electrical coil and the bearing partitioning the electrical coil inside the can and the bearing outside the can. Preferably, the bearing is a circular ball bearing assembly which is insert molded into the actuator.

The present invention provides an electro-magnetic actuator having a shorter magnetic flux flow loop, a stronger clutch actuation force, and a greater electrical efficiency than prior art actuators. Additionally, insert molding the ball bearing assembly into the actuator reduces the cost of the present invention relative to prior art actuators.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
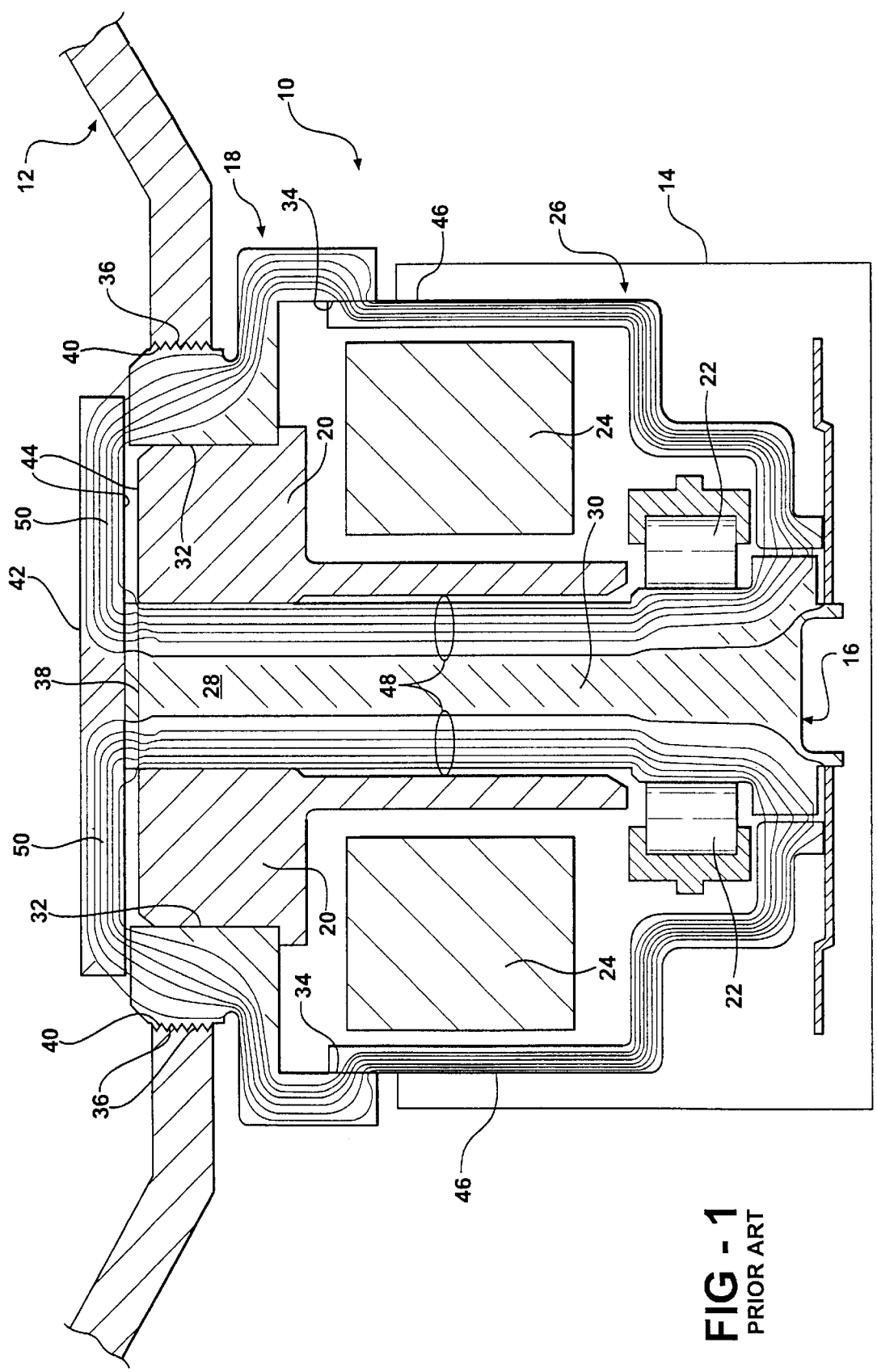
FIG. 1 is a cross-sectional side view of a prior art electro-magnetic actuator attached to a known type of viscous fluid clutch.
Figure 2:
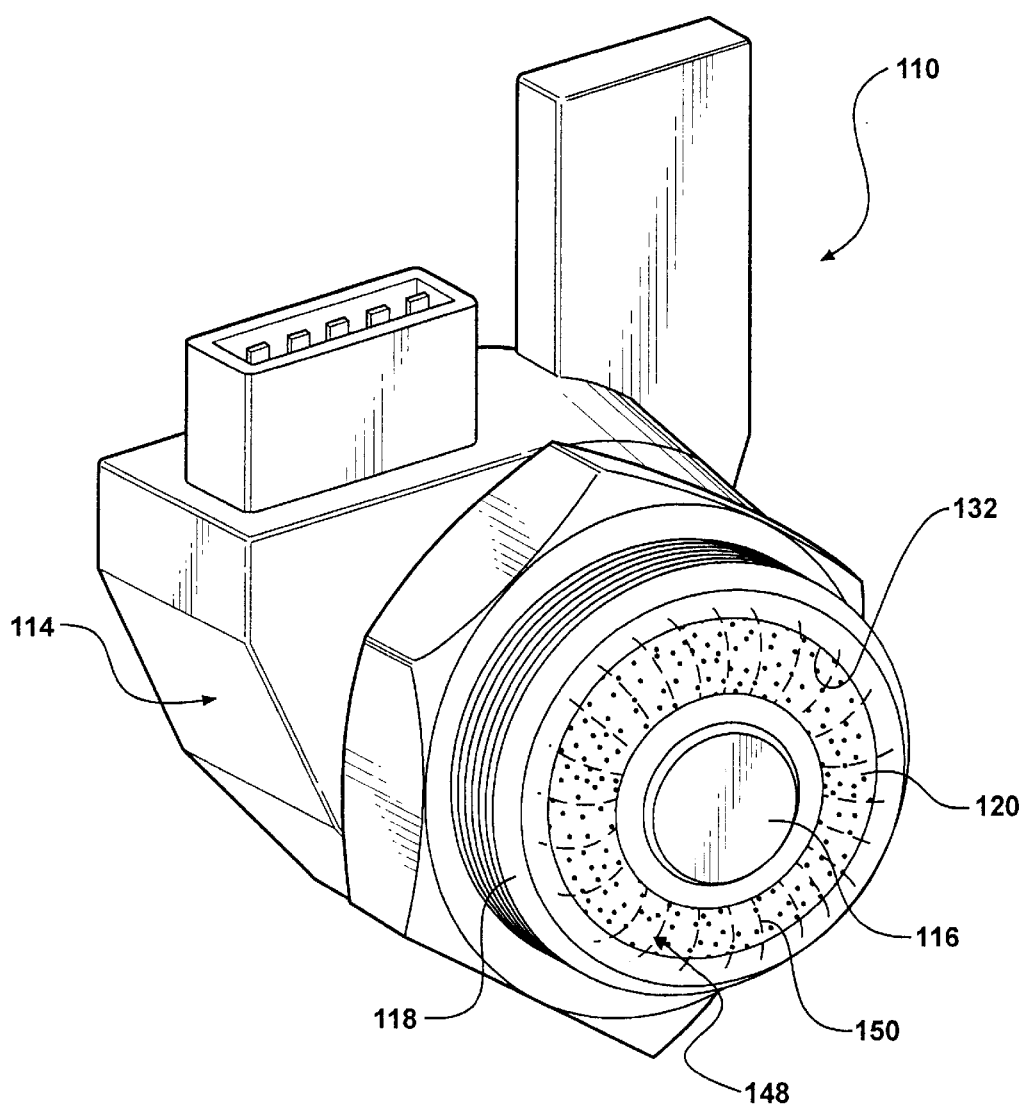
FIG. 2 is a front perspective view of an electro-magnetic actuator in accordance with the present invention.

Referring now to FIG. 2, a front perspective view of an electro-magnetic actuator 110 in accordance with the present invention is illustrated. The actuator 110 is particularly suited to couple with and control a known type of viscous fluid clutch to be installed in a vehicle for the purpose of controlling the operation of an engine cooling fan via a controller, such as a thermostatic sensor.

Figure 3:
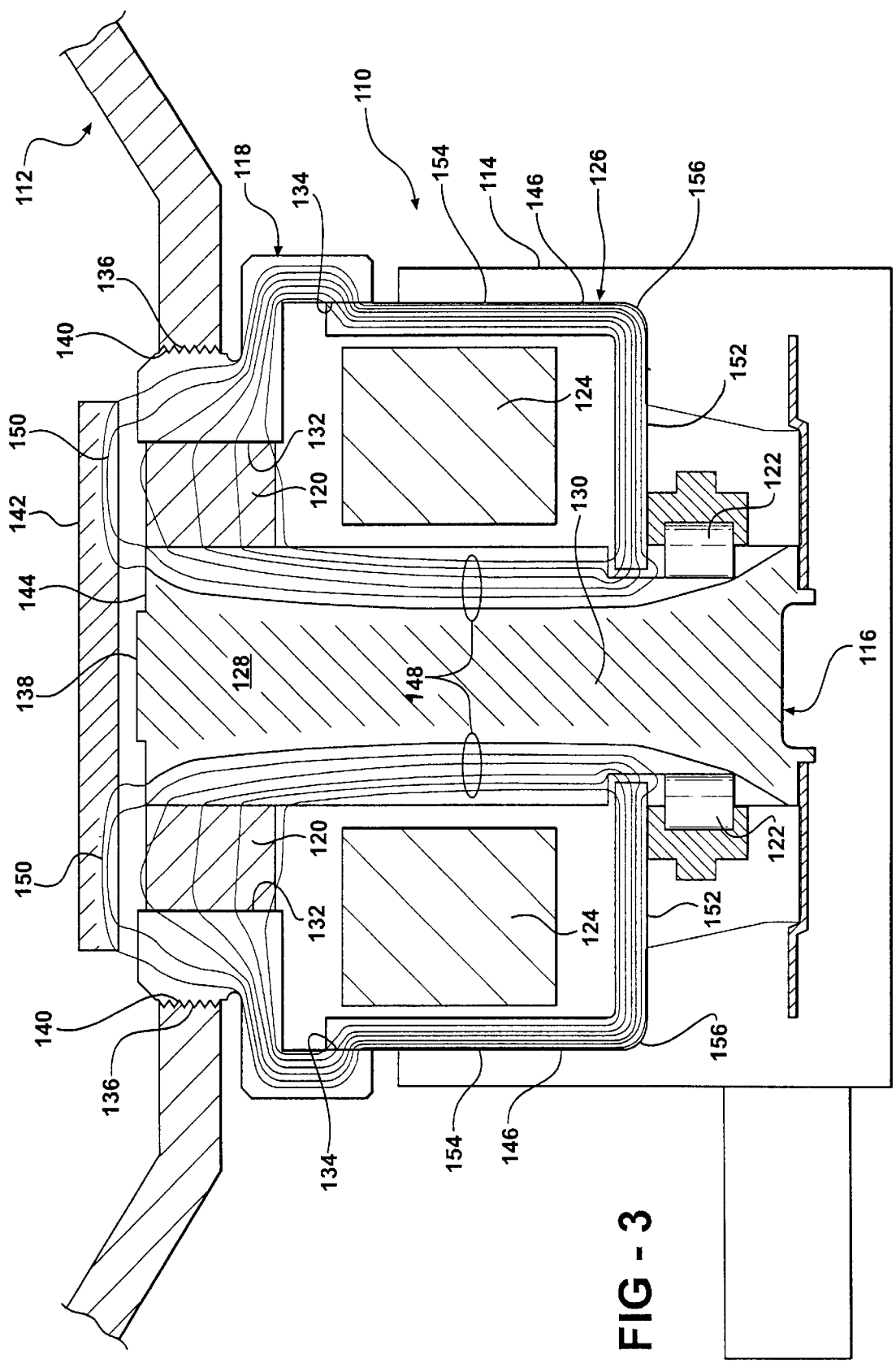
FIG. 3 is a cross-sectional side view of the electro-magnetic actuator in accordance with the present invention attached to a known type of viscous fluid clutch.

FIG. 3 is a cross-sectional side view of the electro-magnetic actuator 110 in accordance with the present invention attached to a known type of viscous fluid clutch 112. The actuator 110 includes a housing 114, a rotary shaft or core 116, a nut 118, a non-magnetic stainless steel bushing 120, a bearing 122, an electrical coil 124, and a ferromagnetic can 126. The rotary shaft 116 includes a first end portion 128 disposed outside the housing 114 and a second end portion 130 disposed inside the housing 114. The entire shaft 116 is adapted to rotate or spin in relation to the housing 114.

The nut 118 includes an inner peripheral surface 132, an outer peripheral surface 134, and a fastening means 136, such as a thread. The fastening means 136 is adapted to attach the actuator 110 to the clutch 112. When attached, the nut 118 spins with the clutch 112. The stainless steel bushing 120 is adapted to couple the first end portion 128 of the shaft 116 and the inner peripheral surface 132 of the nut 118. When coupled, the shaft 116, the bushing 120, and the nut 118 form an interface surface 138 which spins with the clutch 112.

The actuator 110 is threaded into a mounting and interface port 140 in the clutch 112. In this arrangement, the interface surface 138 is disposed adjacent to a spring-loaded armature plate 142 located inside the clutch 112. The interface surface 138 is spaced from the armature plate 142 to form an air gap 144.

The bearing 122 is disposed around the second end portion 130 of the shaft 116. The bearing 122 is adapted to rotatably support the shaft 116. The electrical coil 124 is disposed around the shaft 116 between the nut 118 and the bearing 122. The electrical coil 124 is adapted to receive electrical current and produce magnetic flux.

The ferromagnetic can 126 is disposed around the shaft 116. The can 126 has a peripheral surface 146 extending between the shaft 116 and the outer peripheral surface 134 of the nut 118. The peripheral surface 146 of the can 126 establishes a path for magnetic flux flow between the shaft 116 and the outer peripheral surface 134 of the nut 118.

The peripheral surface 146 of the can 126 is interposed between the electrical coil 124 and the bearing 122 partitioning the electrical coil 124 inside the can 126 and the bearing 122 outside the can 126. The peripheral surface 146 of the can 126 includes a first wall 152 and a second wall 154. The first wall 152 extends radially outward from the second end portion 130 of the shaft 116 between the electrical coil 124 and the bearing 122 to a distal end 156 of the first wall 152 located beyond or outboard of the electrical coil 124. The second wall 154 extends axially with respect to the shaft 116 between the distal end 156 of the first wall 152 and the outer peripheral surface 134 of the nut 118.

In the present invention, the electrical coil 124 is disposed inside the can 126 and the bearing 122 is disposed outside the can 126. Thus, in this design, the bearing 122 can be insert molded into the actuator 110 to reduce cost. Preferably, the bearing 122 is a circular ball bearing assembly.

The electrical coil 124 forms a ring around the entire shaft 116 inside the can 126. When power is applied to the actuator 110, electrical current flows through the coil 124 producing magnetic flux. The magnetic flux flows in a loop 148, hereinafter referred to as a magnetic flux flow loop, which circles radially about the cross-sectional center point of the coil 124. The magnetic flux consists of magnetic lines of force which collectively constitute a magnetic field. The magnetic field is formed in a toroidal or doughnut like shape around the axis of the shaft 116.

The magnetic flux flow loop 148 is illustrated in FIG. 3. The magnetic flux flow loop 148 extends from the first end portion 128 of the shaft 116 through the length of the shaft 116 to the second end portion 130 of the shaft 116, from the second end portion 130 of the shaft 116 along the peripheral surface 146 of the can 126 between the electrical coil 124 and the bearing 122 to the outer peripheral surface 134 of the nut 118, from the outer peripheral surface 134 of the nut 118 through the nut 118 to the inner peripheral surface 132 of the nut 118, and between the inner peripheral surface 132 of the nut 118 and the first end portion 128 of the shaft 116 along an arch-shaped airborne path portion 150.

The non-magnetic bushing 120 prohibits magnetic flux flow directly between the first end portion 128 of the shaft 116 and the inner peripheral surface 132 of the nut 118. As a result, the airborne path portion 150 of the magnetic flux flow loop 148 arches outwardly in relation to the actuator 110 around the non-magnetic bushing 120. The airborne path portion 150 of the magnetic flux flow loop 148 is best shown arching outwardly from the actuator 110 in FIG. 2.

When power is applied to the actuator 110, the airborne path portion 150 of the magnetic flux flow loop 148 applies a magnetic force across the air gap 144 onto the armature plate 142 inside the clutch 112 as shown in FIG. 3. The magnetic force pulls the armature plate 142 inward, from a spring-loaded closed position to an open position, reducing the air gap 144 between the armature plate 142 and the interface surface 138. In the open position, the armature plate 142 permits fluid flow and coupling within the clutch 112. In this manner, the actuator 110 actuates the clutch 112.

When power is not applied to the actuator 110, the armature plate 142 returns to the spring-loaded off position. In the spring-loaded off position, the armature plate 142 restricts fluid flow and coupling within the clutch 112. In this manner, the clutch 112 is deactuated.

Figure 4:
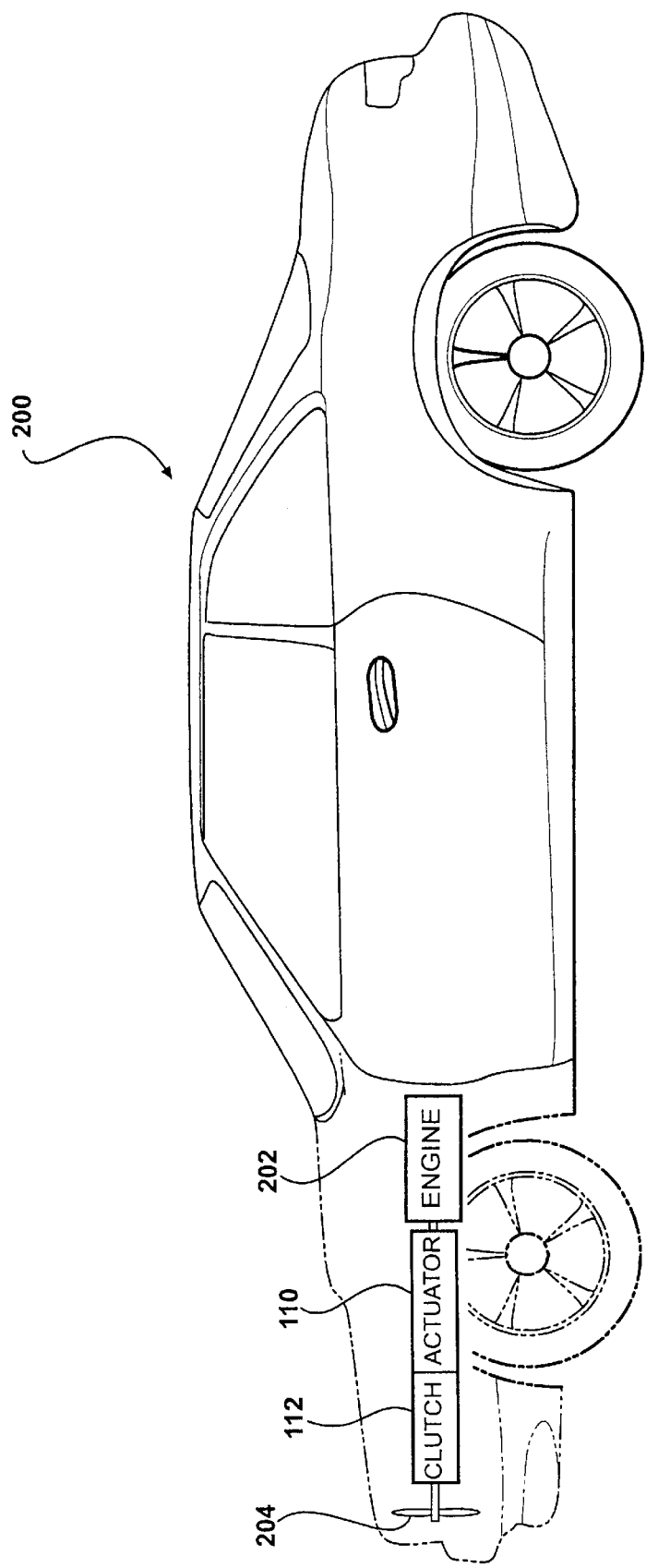
FIG. 4 is a partially fragmented view of a vehicle including the electro-magnetic actuator in accordance with the present invention connected to a engine cooling fan and a viscous fluid clutch.

FIG. 4 shows a vehicle 200 including an engine 202 and the electro-magnetic actuator 110 coupled to a known viscous fluid clutch 112 associated with an engine cooling fan 204. The clutch 112 is designed to couple and decouple the fan 204 and the engine 202. When the clutch 112 is actuated, a rotary force is transmitted from the engine 202 through the clutch 112 to the fan 204. The actuator 110 according to the present invention is used to actuate and deactuate the clutch 112.

The present invention provides an electro-magnetic actuator having a shorter magnetic flux flow loop, a stronger clutch actuation force, and a greater electrical efficiency than prior art actuators. Additionally, insert molding the ball bearing assembly into the actuator reduces the cost of the present invention relative to prior art actuators.

What is claimed is:

1. An electro-magnetic actuator for controlling a clutch to be installed in a vehicle, the actuator comprising:
    a shaft having a first end portion and a second end portion;
    a nut having an inner peripheral surface and an outer peripheral surface, said inner peripheral surface coupled with said first end portion of said shaft;
    a bearing disposed around said second end portion of said shaft for rotatably supporting said shaft;
    an electrical coil disposed around said shaft between said nut and said bearing for receiving electrical current and producing magnetic flux; and
    a ferromagnetic can disposed around said shaft having a peripheral surface extending between said shaft and said outer peripheral surface of said nut for establishing a path for magnetic flux flow there between,
    said peripheral surface of said can interposed between said electrical coil and said bearing partitioning said electrical coil inside said can and said bearing outside said can.

2. The actuator asset forth in claim 1 including a bushing disposed between said first end portion of said shaft and said inner peripheral surface of said nut for coupling said shaft and said nut.

3. The actuator as set forth in claim 2 wherein said bushing is formed from a non-magnetic material for prohibiting magnetic flux flow directly between said first end portion of said shaft and said inner peripheral surface of said nut.

4. The actuator as set forth in claim 1 wherein magnetic flux produced by said electrical coil flows in a loop about said electrical coil, said magnetic flux flow loop extending from said first end portion of said shaft through said shaft to said second end portion of said shaft, from said second end portion of said shaft along said peripheral surface of said can between said electrical coil and said bearing to said outer peripheral surface of said nut, from said outer peripheral surface of said nut through said nut to said inner peripheral surface of said nut, and between said inner peripheral surface of said nut and said first end portion of said shaft along an arch-shaped airborne path portion, said airborne path portion arching outwardly from the actuator.

5. The actuator as set forth in claim 4 wherein said arch-shaped airborne path portion of said magnetic flux flow loop applies a magnetic force onto a portion of the clutch when said actuator is assembled to the clutch.

6. The actuator as set forth in claim 1 wherein said peripheral surface of said can includes a first wall extending radially outward from said second end portion of said shaft between said electrical coil and said bearing to a distal end of said first wall located beyond said electrical coil, and a second wall extending axially with respect to said shaft between said distal end of said first wall and said outer peripheral surface of said nut.

7. The actuator as set forth in claim 1 wherein said bearing is an insert molded bearing fixed inside said actuator.

8. The actuator as set forth in claim 1 wherein said can is an L-shaped member, a first wall extending radially outward from said shaft between said coil and said bearing to a distal end of said first wall located beyond said electrical coil, and a second wall extending axially with respect to said shaft from said distal end of said first wall and said outer peripheral surface of said nut.

9. A combination of an electro-magnetic actuator and a viscous fluid clutch installed in a vehicle, the clutch having an armature plate for controlling fluid coupling within the clutch, the actuator comprising:
    a shaft having a first end portion and a second end portion;
    a nut having an inner peripheral surface and an outer peripheral surface, said inner peripheral surface coupled with said first end portion of said shaft;
    a bearing disposed around said second end portion of said shaft for rotatably supporting said shaft;
    an electrical coil disposed around said shaft between said nut and said bearing for receiving electrical current and producing magnetic flux; and
    a ferromagnetic can disposed around said shaft having a peripheral surface extending between said shaft and said outer peripheral surface of said nut for establishing a path for magnetic flux flow there between,
    said peripheral surface of said can interposed between said electrical coil and said bearing partitioning said electrical coil inside said can and said bearing outside said can.

10. The combination as set forth in claim 9 wherein the actuator includes a bushing disposed between said first end portion of said shaft and said inner peripheral surface of said nut for coupling said shaft and said nut.

11. The combination as set forth in claim 10 wherein said bushing is formed from a non-magnetic material for prohibiting magnetic flux flow directly between said first end portion of said shaft and said inner peripheral surface of said nut.

12. The combination as set forth in claim 9 wherein magnetic flux produced by said electrical coil flows in a loop about said electrical coil, said magnetic flux flow loop extending from said first end portion of said shaft through said shaft to said second end portion of said shaft, from said second end portion of said shaft along said peripheral surface of said can between said electrical coil and said bearing to said outer peripheral surface of said nut, from said outer peripheral surface of said nut through said nut to said inner peripheral surface of said nut, and between said inner peripheral surface of said nut and said first end portion of said shaft along an arch-shaped airborne path portion, said airborne path portion arching outwardly from the actuator.

13. The combination as set forth in claim 12 wherein said arch-shaped airborne path portion of said magnetic flux flow loop applies a magnetic force onto the armature plate of the clutch displacing the armature plate toward the actuator and actuating the clutch.

14. The combination as set forth in claim 9 wherein said peripheral surface of said can includes a first wall extending radially outward from said second end portion of said shaft between said electrical coil and said bearing to a distal end of said first wall located beyond said electrical coil, and a second wall extending axially with respect to said shaft between said distal end of said first wall and said outer peripheral surface of said nut.

15. The combination as set forth in claim 9 wherein said bearing is an insert molded bearing fixed inside said actuator.

16. The combination as set forth in claim 8 wherein said can is an L-shaped member, a first wall extending radially outward from said shaft between said coil and said bearing to a distal end of said first wall located beyond said electrical coil, and a second wall extending axially with respect to said shaft from said distal end of said first wall and said outer peripheral surface of said nut.

* * * * *

(12) EX PARTE REEXAMINATION CERTIFICATE (8215th)

United States Patent
Budd et al.

(10) Number: US 6,557,686 C1
(45) Certificate Issued: May 10, 2011

(54) ELECTRO-MAGNETIC ACTUATOR HAVING A SHORTENED MAGNETIC FLUX FLOW LOOP

(75) Inventors: Walter J. Budd, Rochester, MI (US); Steve R. Hojnacki, Jupiter, FL (US); Thomas J. Dolinshek, Baltimore, MI (US)

(73) Assignee: Pontiac Coil, Inc., Clarkston, MI (US)

Reexamination Request:
No. 90/008,275, Oct. 2, 2006

Reexamination Certificate for:
Patent No.: 6,557,686
Issued: May 6, 2003
Appl. No.: 09/548,757
Filed: Apr. 13, 2000

Related U.S. Application Data
(60) Provisional application No. 60/129,161, filed on Apr. 14, 1999.

(51) Int. Cl.
*F16D 35/02* (2006.01)
*F16D 35/00* (2006.01)

(52) U.S. Cl. ...................... 192/84.1; 335/220

(58) Field of Classification Search ............ 192/45
See application file for complete search history.

(56) References Cited

U.S. PATENT DOCUMENTS

| | | |
|---|---|---|
| 2,267,114 A | 12/1941 | Lear et al. |
| 2,481,028 A | 9/1949 | Lear |
| 4,106,602 A | 8/1978 | Dieckermann ............... 192/45 |

*Primary Examiner* — Sam Rimell

(57) ABSTRACT

An electro-magnetic actuator includes a shaft having a first end portion and a second end portion and a nut having an inner peripheral surface and an outer peripheral surface. The inner peripheral surface of the nut is coupled with the first end portion of the shaft. A bearing is disposed around the second end portion of the shaft for rotatably supporting the shaft. An electrical coil is disposed around the shaft between the nut and the bearing for receiving electrical current and producing magnetic flux. A ferromagnetic can is disposed around the shaft having a peripheral surface extending between the shaft and the outer peripheral surface of the nut for establishing a path for magnetic flux flow there between. The peripheral surface of the can is interposed between the electrical coil and the bearing partitioning the electrical oil inside the can and the bearing outside the can.

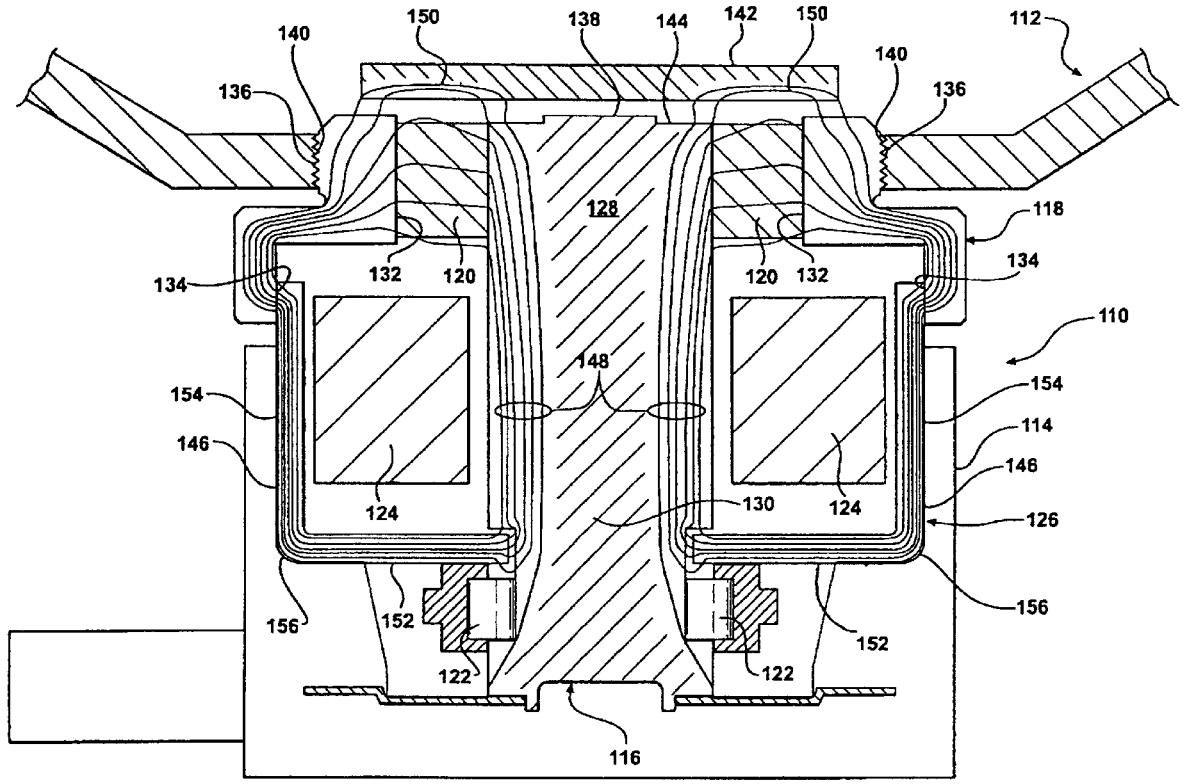

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7 and 15 is confirmed.

Claims 1-6, 8-14 and 16 are cancelled.

New claim 17 is added and determined to be patentable.

*17. An electromagnetic actuator for controlling a clutch in an automotive vehicle comprising as a unitary assembly:*

*a shaft having a first end portion and second end portion;*

*a nut having an inner peripheral surface and an outer peripheral surface, said inner peripheral surface coupled with said first end portion of said shaft;*

*a bearing disposed around the second end said portion of said shaft for rotatably supporting said shaft;*

*a molded housing, said bearing being insert molded into said housing such that the housing supports said shaft second end;*

*an electrical coil disposed around said shaft between said nut and said bearing for receiving electrical current and producing magnetic flux; and*

*a ferromagnetic can disposed around said shaft and within said housing and having a peripheral surface extending between said shaft and said outer peripheral surface of said nut for establishing a path for magnetic flux flow therebetween, said peripheral surface of said can interposed between said electrical coil and said bearing partitioning said electrical coil inside said can with said bearing outside of the interior volume of said can.*

\* \* \* \* \*